Patented Jan. 20, 1953

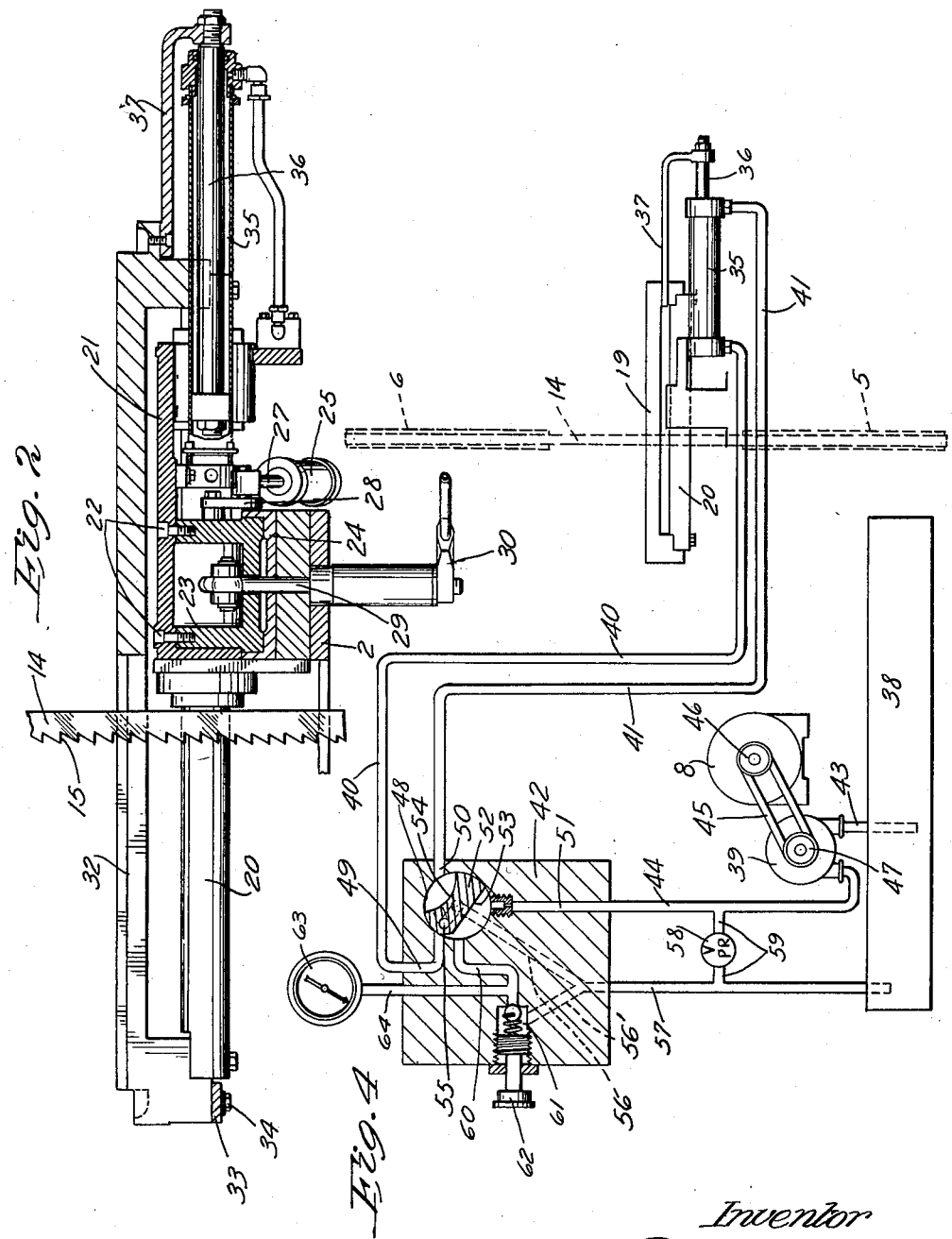

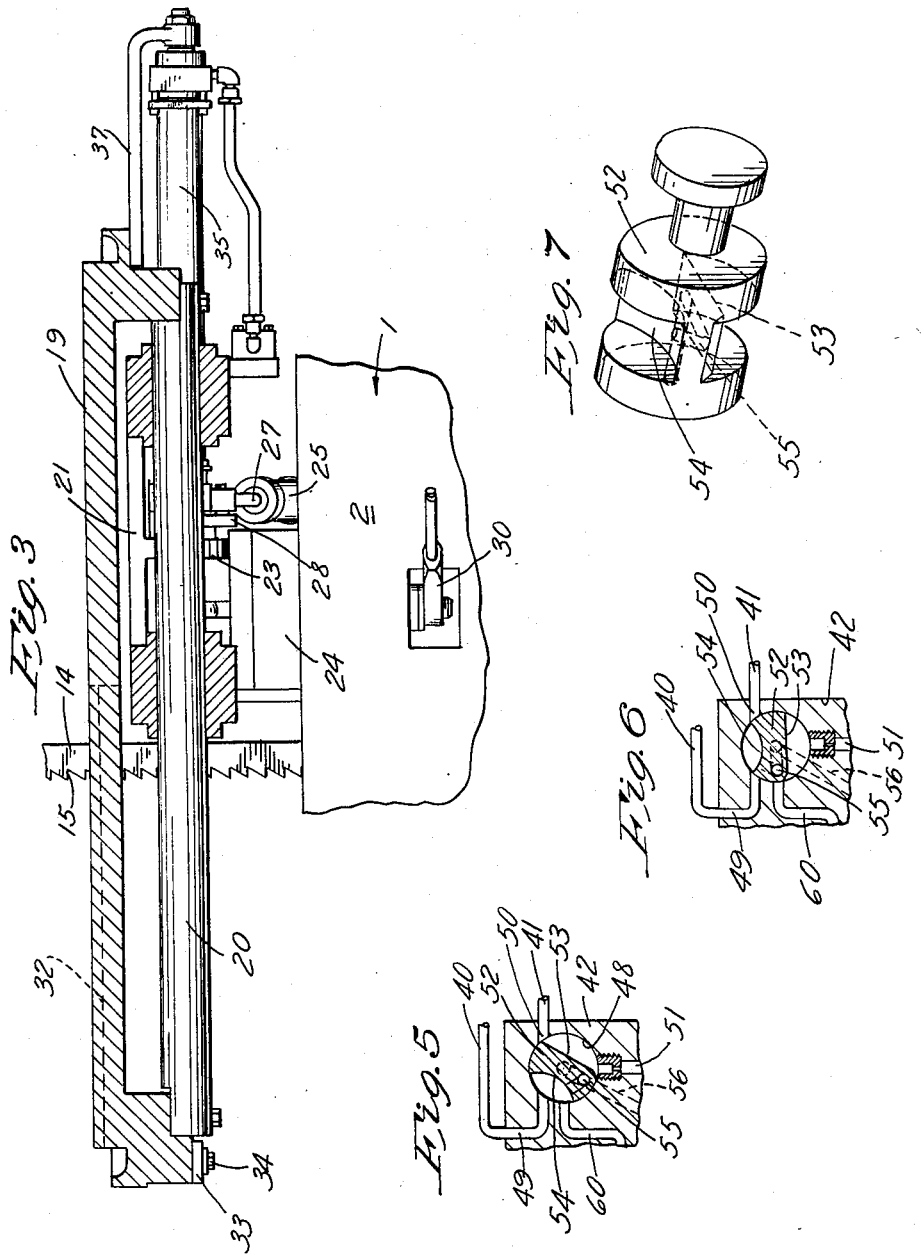

2,625,965

UNITED STATES PATENT OFFICE 2,625,965

WORKTABLE FEEDING MECHANISM FOR BAND SAW MACHINES

Robert L. Crane, Glen Lake, Minn., assignor to Continental Machines, Inc., Savage, Minn., a corporation of Minnesota Application May 10, 1950, Serial No. 161,056

1 Claim. (Cl. 143—25)

My present invention relates generally to machine tools and more specifically to such device having a movable workpiece-supporting table, whereby the workpiece is moved into engagement with a cutting tool.

More particularly, my invention contemplates the use of a movable cutting band and a workpiece-supporting table movable in a direction transversely of the direction of movement of said cutting band.

An important object of my invention is the provision of a device of the type set forth having means whereby the speed of feeding movement of the work table is governed by pressure of the work held thereon against the cutting tool.

Another object of my invention is the provision of means whereby the feeding movement of the workpiece-supporting table remains constant irrespective of pressure applied to the cutting tool by the workpiece.

Another object of my invention is the provision of means whereby speed of feeding movement of the workpiece-supporting table remains constant under a maximum predetermined pressure of the workpiece against the cutting tool.

A still further object of my invention is the provision of means whereby pressure of the workpiece against the cutting tool remains constant under a maximum predetermined speed of feeding movement of the work-supporting table.

Still another object of my invention is a provision of fluid pressure-operated means imparting feeding and return movements to the work-supporting table.

Another object of my invention is the provision of a machine, as set forth, which is rugged in construction and efficient and durable in use.

Other highly important objects and advantages will become apparent from the following detailed specification, appended claim and attached drawings.

Referring to the drawings, wherein like characters indicate like parts throughout the several views:

Fig. 2 is an enlarged fragmentary section taken substantially on the line 2—2 of Fig. 1;

Fig. 3 is an enlarged section taken substantially on the line 3—3 of Fig. 1;

Figure 1:
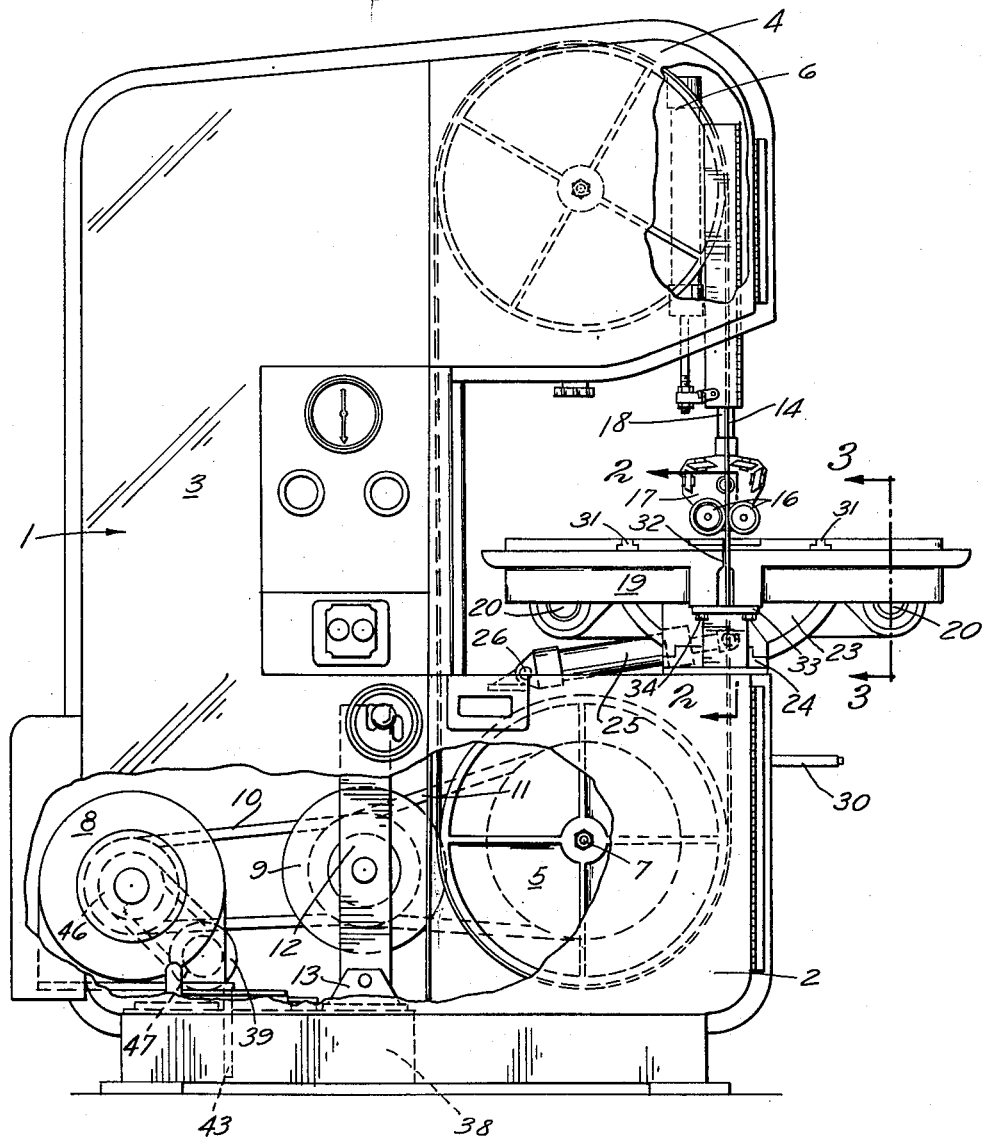
Fig. 1 is a view in front elevation of a band saw built in accordance with my invention, some parts being broken away.

Fig. 4, sheet 2, is a diagrammatic view of the fluid pressure system of my invention;

Fig. 5, sheet 3, is a fragmentary detail of Fig. 4 showing a different position of some of the parts;

Fig. 6 is a view corresponding with Fig. 5 but showing a still different position of some of the parts; and Fig. 7 is a view in perspective of a valve element of my invention.

Referring with greater detail to the drawings, the numeral 1 indicates in its entirety a frame structure comprising a base portion 2, a vertically extended column 3 and a head 4 projecting laterally outwardly from the upper end of the column 3 in overlying spaced relationship to a portion of the base 2. The frame structure 1 is preferably fabricated from steel, and in a manner to impart extreme rigidity thereto.

Mounted for rotary movements in a common plane in the base below the table and head above the table respectively are a drive wheel 5 and an idler wheel 6. The drive wheel 5 is connected to a power output shaft 7 which is driven by a motor 8 through a conventional variable speed pulley 9 and a gear transmission, not shown. An endless belt 10 drives the variable speed pulley 9 and a second endless belt 11 transmits power from the variable speed pulley 9 to the drive wheel 5 through the gear transmission, not shown. The variable speed pulley is suitably mounted on a shifter arm 12 having one end pivotally secured to a bracket 13 of the frame structure 1.

An endless cutting band 14 runs over the wheels 5 and 6, which are adapted to rotate in a clockwise direction with respect to Fig. 1. The cutting band 14 may be one of a number of types, but for the purpose of the present example, is in the nature of a band saw having cutting teeth 15. The cutting band 14 is guided for cutting movement between a pair of guide rollers 16 journalled on a mounting plate 17, which is secured to a supporting post or the like 18 depending from the head 4 of the frame structure, and rigidly mounted thereon by suitable means, not shown. Mounted on the laterally-outwardly projecting portion of the base 2 for reciprocatory work-feeding and return movements in a direction transversely of the direction of movement of the cutting band 14 is a work-holding table 19. The table 19 has rigidly secured thereto a pair of spaced parallel slide rods 20, which are mounted for sliding movements in a bracket or frame 21. The bracket 21 is rigidly secured by machine screws or the like 22 to a segmental trunnion-acting member 23, which is mounted for rocking movements in a saddle-like support 24, rigidly secured to the base 2 beneath the head 4. This arrangement permits the table 19 to be tilted with respect to the cutting band 14, which tilting is accomplished by a fluid pressure cylinder 25 pivotally mounted at one end to the base 2, as indicated at 26, and a cooperating piston plunger 27. The outer end of the plunger 27 is pivotally secured to an end of a rigid link 28 connected to the segmental member 23. The cylinder 25 comprises a portion of a fluid pressure system including conduit and operating valves, not shown. The mounting frame 21 and table 19 carried thereby are locked in a predetermined tilted or level position by a screw clamp 29 and a nut-acting handle 30. The work table 19 is provided with a plurality of T-slots 31 for the reception of clamping bolts, not shown, but by means of which work to be cut may be clamped to the table for common feeding movements therewith. The table 19 is further provided with a central horizontally elongated vertical slot 32 parallel to the slide rods 20 and through which the cutting band 14 extends. The forward edge portion of the table 19 is reinforced by a brace member 33, which is detachably secured to the underside of the table 19 by bolts or the like 34.

For the purpose of imparting reciprocatory work-feeding and return movements to the table 19, I provide a fluid pressure-operated cylinder 35 and a cooperating piston plunger rod 36 one end of which projects from one end of the cylinder 35, and means for introducing fluid under pressure selectively to opposite ends of the cylinder 35. Said cylinder 35 is rigidly mounted to the bracket 21, its axis disposed parallel to the direction of reciprocatory movement of the table 19, and the free end of the plunger rod 36 is rigidly secured to the outer end of an arm 37 connected to and extending rearwardly of the table 19. Fluid under pressure is supplied to the opposite ends of the cylinder 35 from a supply tank or reservoir 38 in the base 2 by a pump 39 through fluid pressure conduits 40 and 41 extending from a valve block or housing 42 on the frame 1 to said opposite ends of the cylinder 35. A fluid conduit 43 connects the intake of the pump 39 to the reservoir 38, and a pressure conduit 44 extends from the output of the pump 39 to the valve block 42. The pump 39 is supported by the frame above the reservoir and is driven by the motor 8 through an endless belt 45 running over a pulley 46 on the shaft of the motor 8 and another pulley 47 fast on the shaft of the pump 39. A valve chamber 48 in the block 42 communicates with the conduits 40, 41 and 44 by means of respective passages 49, 50 and 51 in said valve block. A rotary metering and reversing valve element 52 is manually movable to permit fluid to flow from the passage 51 to either of the passages 49 or 50, as desired. The valve element 52 is generally cylindrical in cross-section and is provided with a pair of diametrically opposed cut-away portions or compartments 53 and 54, the former of which communicates with the passage 51, and the latter of which is adapted to communicate with either of the passages 49 or 50 upon rotation of the valve element in the block 42, see Figs. 4, 5, and 7. The valve element 52 is further provided with a passage 55 which communicates with the cut-away portion 54 and extends axially of the valve element to communicate with a fluid passage 56 in the valve block that terminates in a fluid return conduit 57 extending from the valve block 42 to the reservoir 38. It will be seen by reference to Fig. 4 that a pressure relief valve 58 connects the fluid pressure conduit 44 and the return conduit 57 by means of a fluid conduit 59. A fluid passage 60 extends from the valve chamber 48 to an adjustable pressure regulator valve 61 and from thence through passage 56' to the fluid return passage 56 within the block 42. The pressure regulator valve 61 is adjustable by means of a screw-threaded adjustment knob 62, whereby to vary pressure of fluid to the cylinder 35 through the conduit 40. This pressure is indicated on a dial pressure indicator 63 suitably mounted on the valve block 42 and communicating with the passage 60 between the valve chamber 48 and the pressure regulator valve 61 by a fluid passage 64.

Assuming that the motor 8 is operating, and with the valve element 52 in the position illustrated in Fig. 4, the pump 39 delivers fluid under pressure from the reservoir 38 to the valve chamber 48, through the compartment 53, the passage 49 and the conduit 40, to one end of the cylinder 35, whereby to move the table 19 in a direction to feed work mounted thereon toward the cutting band 14. During the feeding movement, fluid flows from the opposite end of the cylinder through the conduit 41, the compartment 54 and the passage 55 in the valve element 52, the passage 56, and conduit 57 to the reservoir 58. It will be noted that fluid under pressure in the compartment 53 is free to enter the passages 60 and 64 to the pressure regulator valve 61 and pressure indicator 63 respectively. Movement of the valve element 52 to its position in Fig. 5 causes fluid to be pumped to said opposite end of the cylinder 35 through the conduit 41, causing return movement of the table 19. During this return movement, fluid flows from said one end of the cylinder 35 through the conduit 40 to the compartment 54, and from thence to the reservoir 38 through the passages 55 and 56 and the conduit 57. When the valve element 52 is rotated to its neutral position illustrated in Fig. 6, both conduits 40 and 41 are blocked and the table 19 is locked thereby against either feed or return movements. With the valve element 52 in this position, fluid under pressure from the pump 39 will be bypassed through the pressure relief valve 58 and returned to the reservoir 38.

The valve element 52 may be rotated to cause the compartment 53 to be in communication with the passage 49 to a greater or lesser degree whereby to meter the flow of the fluid therethrough, thus controlling the speed of feeding movement of the work-supporting table 19. The pressure regulator valve 61, being adjustable by manipulation of the knob 62, determines the pressure at which the work is moved against the cutting band. The above-described valves operate to provide for several feeding arrangements, as follows:

A. The valve 61 may be set to a maximum pressure wherein the feeding movement is controlled solely by manipulation of the valve element 52: In other words, the workpiece may be fed to the cutting band at a predetermined speed irrespective of the pressure exerted by the workpiece against the cutting band.

B. The valve element 52 may be set for a maximum flow of fluid to the cylinder 35, and the valve 61 may be adjusted so that the speed of feeding movement of the table 19 is determined entirely by pressure exerted by the workpiece against the cutting band.

C. By other adjustments of the valve element 52 and valve 61 the workpiece may be fed to the cutting band at a definite speed, providing that the predetermined pressure is not exceeded.

D. By still other adjustments of the valve element 52 and the valve 61, the workpiece may be fed to the cutting band at a definite pressure, providing that a predetermined speed is not exceeded.

From the above it will be seen that I have provided a band saw machine which is very flexible in its operation and which is completely satisfactory for the accomplishment of the objectives set forth; and while I have shown and described a commercial embodiment of my improved machine it will be understood that the same is capable of modification without departure from the scope and spirit of the invention as defined in the claim.

What I claim is:

In a band saw machine, a frame including a base portion, a vertically disposed column and a head overhanging said base portion in vertically spaced relation thereto at one side of said column, a bracket supported on the base portion beneath the overhanging head, a work-holding table slidably supported on said bracket, a pair of vertically aligned band carrying wheels respectively rotatably supported on said head and said base above and below said table, a cutting band operatively engaged over said wheels, a horizontally elongated vertical slot in said table through which said band moves, fluid pressure operating means for imparting reciprocatory feeding and return movements to the table, said fluid pressure operating means comprising a cylinder rigidly supported by said bracket with its axis disposed parallel to the direction of said reciprocatory movements of the table, a piston rod in said cylinder with one end thereof projecting from one end of the cylinder, an arm having one end thereof secured to said projecting end of the piston rod and its opposite end connected to the table, a fluid reservoir disposed in said base, a pump supported by said frame and disposed above said reservoir for delivering fluid under pressure from said reservoir to said cylinder, and control means regulating the speed of feeding movement of the table toward and pressure of the workpiece against the cutting band, said control means comprising a manually operated metering and reversing valve on said frame and a manually operated pressure control valve on said frame, said valves being operatively associated with said cylinder and pump, a pressure relief valve between and in communication with said metering and reversing valve and said pressure control valve, a manually operated control knob for said pressure control valve, a single manually operated control knob for said metering and reversing valve, each of said valves being operable independently of the other thereof, whereby to control selectively the speed of feeding movement of the table irrespective of the feeding pressure, or the feeding pressure irrespective of the speed of feeding movement.

ROBERT L. CRANE.

REFERENCES CITED

The following references are of record in the file of this patent:

UNITED STATES PATENTS

| Number | Name | Date |
|---|---|---|
| 2,234,009 | Robinson | Mar. 4, 1941 |
| 2,254,046 | Pearson | Aug. 26, 1941 |
| 2,327,920 | Moohl | Aug. 24, 1943 |
| 2,360,070 | Meyerbach | Oct. 10, 1944 |
| 2,530,880 | Hermann | Nov. 21, 1950 |

FOREIGN PATENTS

| Number | Country | Date |
|---|---|---|
| 140,167 | Austria | Jan. 10, 1935 |